US009600346B2

(12) United States Patent
Kuesel et al.

(10) Patent No.: US 9,600,346 B2
(45) Date of Patent: Mar. 21, 2017

(54) THREAD SCHEDULING ACROSS HETEROGENEOUS PROCESSING ELEMENTS WITH RESOURCE MAPPING

(71) Applicant: International Business Machines Corporation, Armonk, NY (US)

(72) Inventors: Jamie R. Kuesel, Rochester, MN (US); Mark G. Kupferschmidt, Bothell, WA (US); Paul E. Schardt, Rochester, MN (US); Robert A. Shearer, Woodinville, WA (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 13/938,683

(22) Filed: Jul. 10, 2013

(65) Prior Publication Data
US 2015/0020078 A1   Jan. 15, 2015

(51) Int. Cl.
*G06F 9/46*    (2006.01)
*G06F 9/50*    (2006.01)
*G06F 9/48*    (2006.01)

(52) U.S. Cl.
CPC .......... *G06F 9/5083* (2013.01); *G06F 9/4881* (2013.01); *G06F 9/5027* (2013.01); *G06F 2209/5018* (2013.01)

(58) Field of Classification Search
CPC ........ G06F 9/46; G06F 9/4881; G06F 9/5027; G06F 9/5083; G06F 2209/5018
USPC .................. 718/100, 102, 104, 105
See application file for complete search history.

(56) References Cited

U.S. PATENT DOCUMENTS

| | | | |
|---|---|---|---|
| 6,850,895 B2 * | 2/2005 | Brodersen et al. | .......... 705/7.14 |
| 7,356,819 B1 | 4/2008 | Ricart et al. | |
| 7,689,993 B2 | 3/2010 | Lindsley | |
| 8,332,854 B2 * | 12/2012 | Kinsey | .................. G06F 9/4881 718/100 |
| 8,510,749 B2 * | 8/2013 | Elnozahy | .................. G06F 9/54 718/100 |
| 8,527,970 B1 * | 9/2013 | Luecke | .......................... 717/140 |
| 2004/0019891 A1 * | 1/2004 | Koenen | .......................... 718/102 |
| 2008/0022283 A1 | 1/2008 | Krieger et al. | |
| 2008/0184240 A1 * | 7/2008 | Franaszek | ............. G06F 9/4881 718/102 |

(Continued)

OTHER PUBLICATIONS

Peh et al. "The design and development of a distributed scheduler agent", International Conference on Algorithms & Architectures for Parallel Processing, 1996. ICAPP 96. 1996 IEEE Second, Jun. 11-13, 1996, pp. 108-115.*

(Continued)

*Primary Examiner* — Abdullah Al Kawsar
*Assistant Examiner* — Willy W Huaracha
(74) *Attorney, Agent, or Firm* — Middleton Reutlinger

(57) ABSTRACT

A system and program product for scheduling processes of a workload on a plurality of hardware threads configured in a plurality of processing elements of a multithreading parallel computing system for processing thereby. Process dimensions for each process are determined based on processing attributes associated with each process, and a place and route algorithm is utilized to map the processes to a processor space representative of the processing resources of the computing system based at least in part on the process dimensions to thereby distribute the processes of the workload.

20 Claims, 13 Drawing Sheets

(56) References Cited

U.S. PATENT DOCUMENTS

| | | |
|---|---|---|
| 2008/0250414 A1 | 10/2008 | Brokenshire et al. |
| 2010/0017804 A1* | 1/2010 | Gupta et al. .................. 718/102 |
| 2010/0146513 A1* | 6/2010 | Song ............................. 718/104 |
| 2011/0066828 A1* | 3/2011 | Wolfe et al. .................. 712/220 |
| 2011/0093638 A1 | 4/2011 | Divirgilio et al. |
| 2011/0161969 A1 | 6/2011 | Arndt et al. |
| 2014/0143783 A1* | 5/2014 | Bose et al. .................... 718/102 |
| 2014/0181825 A1* | 6/2014 | He et al. ....................... 718/102 |

OTHER PUBLICATIONS

U.S. Patent and Trademark Office, Office Action issued in related U.S. Appl. No. 14/841,004 dated Jul. 11, 2016.

\* cited by examiner

THREAD SCHEDULING ACROSS HETEROGENEOUS PROCESSING ELEMENTS WITH RESOURCE MAPPING

FIELD OF THE INVENTION

The invention is generally related to data processing, and in particular to processor architectures and multithreading.

BACKGROUND OF THE INVENTION

As semiconductor technology continues to inch closer to practical limitations in terms of increases in clock speed, architects are increasingly focusing on parallelism in processor architectures to obtain performance improvements. At the integrated circuit device, or chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

The net result of applying the aforementioned techniques is an ability to provide multithreaded processing environment with a pool of hardware threads distributed among one or more processing cores in one or more processor chips and in one or more computers, and capable of processing a plurality of instruction streams in parallel. It is expected that as technology increases, processor architectures will be able to support hundreds or thousands of hardware threads, and when multiple processors are combined into high performance computing systems such as supercomputers and massively parallel computers, a potential exists to support millions of hardware threads. With such multithreaded processing environments, workload distribution across the large number of hardware threads is an increasingly important factor in realizing the efficiencies of parallel processing.

Therefore, a significant need exists in the art for a manner of efficiently distributing workloads in a multithreaded environment to maximize performance in the multithreaded environment.

SUMMARY OF THE INVENTION

The invention addresses these and other problems associated with the prior art by providing system and program product that map processes of a workload to hardware threads disposed in processing elements of a processing system utilizing a place and route mapping algorithm. A processing element generally includes one or more execution units and related hardware resources for executing instructions of a process and one or more hardware threads disposed therein that process one or more software threads of one or more processes. Consistent with embodiments of the invention, one or more processing attributes of one or more processes of a workload may be analyzed to determine process dimensions for each process of the workload. The processing attributes generally describe hardware requirements associated with execution of the process.

The hardware threads of the processing system may be represented by a processor space, where a location of the processor space may correspond to a hardware thread, and more generally a portion of the processor space may correspond to a processing element. Using a place and route algorithm, the processes may be mapped to the processor space based on the process dimensions for each process such that the processes are evenly distributed over the hardware threads of the system. Moreover the processes may be logically grouped based on processing attributes/dimensions such that related processes may be distributed to proximate hardware threads (i.e., hardware threads disposed in a common processing element and/or hardware threads disposed in processing elements connected over a high-speed interconnect/communication bus). The processes are scheduled for processing at the hardware threads of the processing system based on the mapped processor space.

In addition, in some embodiments, processing elements of the processing system include different configurations of hardware resources such that hardware threads are associated with different types of hardware resources, i.e., the processing elements are heterogeneous processing elements. In such embodiments, the place and route algorithm may map the processes to the processor space based at least in part on the configuration of hardware resources associated with each hardware thread. In some embodiments, processing elements may include specialized hardware resources for processing particular types of processes. For example, some processing elements may include hardware resources for digital signal processing (DSP), graphics processing, single instruction multiple data (SIMD) processing, etc.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

Figure 1:
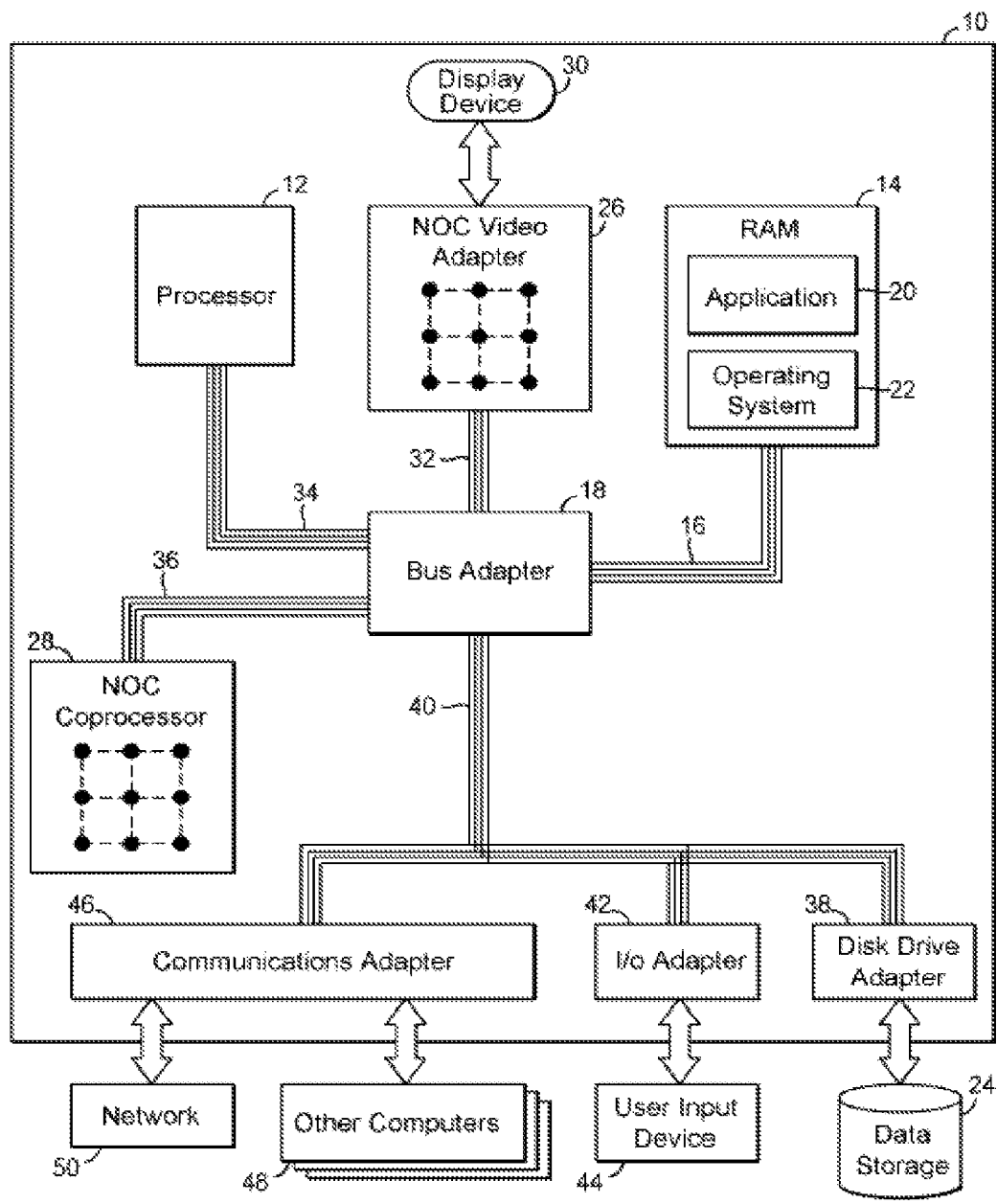
FIG. 1 is a block diagram of exemplary automated computing machinery including an exemplary computer useful in data processing consistent with embodiments of the present invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Embodiments consistent with the invention schedule processes of a workload on a plurality of hardware threads disposed in a plurality of interconnected processing elements of a computing system by performing a place and route analysis on the processes of the workload based on processing attributes associated with each process. In some embodiments, the processing elements are heterogeneous processing elements including one or more different configurations of hardware resources, such that hardware threads of the processing system are associated with different configurations of hardware resources. Since the hardware threads may be associated with different configurations of hardware resources, some software threads of a process may not execute on some processing elements and/or some software threads may execute faster on some processing elements. Embodiments of the invention may schedule processes of the workload on a plurality of hardware threads configured in a plurality of heterogeneous processing elements based at least in part on the hardware resources associated with each hardware thread. For example a process including DSP operations may be scheduled for one or more hardware threads disposed in a processing element configured with hardware resources for processing DSP operations.

Processing elements, as described with respect to embodiments of the invention generally comprise hardware configured to process one or more software threads of a process with one or more hardware threads configured therein and execute instructions corresponding to the software threads with one or more execution units configured therein. In addition to one or more hardware threads and one or more execution units, a processing element may include additional necessary hardware resources such as one or more levels of cache memory, one or more memory registers, and/or other such hardware resources. Moreover, in heterogeneous processing elements consistent with some embodiments of the invention, processing elements may include one or more different configurations of hardware resources. For example, a first group of processing elements may include one or more vector execution units, while a second group of processing elements may include one or more scalar execution units.

A place and route algorithm generally analyzes hardware components with variable dimensions and combines the hardware components to meet an overall dimensional target of all hardware components. Area of a component on a chip, power requirements of the component, and performance attributes of the component are analyzed to determine dimensions for each hardware component. The dimensions of each hardware component are analyzed using the place and route algorithm, and the hardware components are placed to meet a chip area constraint, and the wiring necessary to connect the hardware components is routed accordingly. Place and route algorithms are commonly used, for example, in the design of printed circuit boards, integrated circuits and field-programmable gate arrays where various electronic components, circuits and logic elements need to be connected together in a limited amount of physical space.

In contrast, within the context of the invention, a place and route algorithm is used not to place hardware components or route wiring between those components in a physical space, but is instead used to schedule processes of a workload in a software environment. In particular, process dimensions of a plurality of processes may be considered to be representative of processing resource usage, and such processes dimensions may be determined for each process in the workload based on processing attributes of each process, such that a place and route algorithm may be used to efficiently distribute those processes across the available processing resources in a computer system. Such processing attributes may include, for example, memory utilization, memory locality, instruction use distribution, AXU utilization, streaming/traditional workloads, coprocessor utilization, power consumption, etc.

Consistent with some embodiments of the invention, processing resources of a computing system may be represented by a processor space, where a particular location of the processor space corresponds to a particular hardware thread, and a particular portion of the processor space corresponds to a particular processing element. In general, hardware threads disposed in a common processing element may be proximately located in the processor space, and processing elements having low communication latency (i.e., connected by a high speed bus) may be proximately located in the processor space. Based on the process dimensions of each process, the processes of a workload may be mapped to the processing space using a place and route algorithm.

By mapping processes to the processor space using a place and route algorithm, the workload may be more effectively distributed across the processing resources of the computing system. In parallel computing systems and/or multithreading environments, distributing a workload evenly across the processing resources of a computing system may increase the realization of performance and/or efficiency benefits associated with parallel processing. Furthermore, in massively parallel processing systems, effective distribution of a workload across a large number of hardware threads generally corresponds to significant performance and/or efficiency benefits. Moreover, in multithreading environments comprising a large number of hardware threads configured in heterogeneous processing elements, processes may be mapped the processor space based at least in part on the hardware resources that may be needed for processing.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
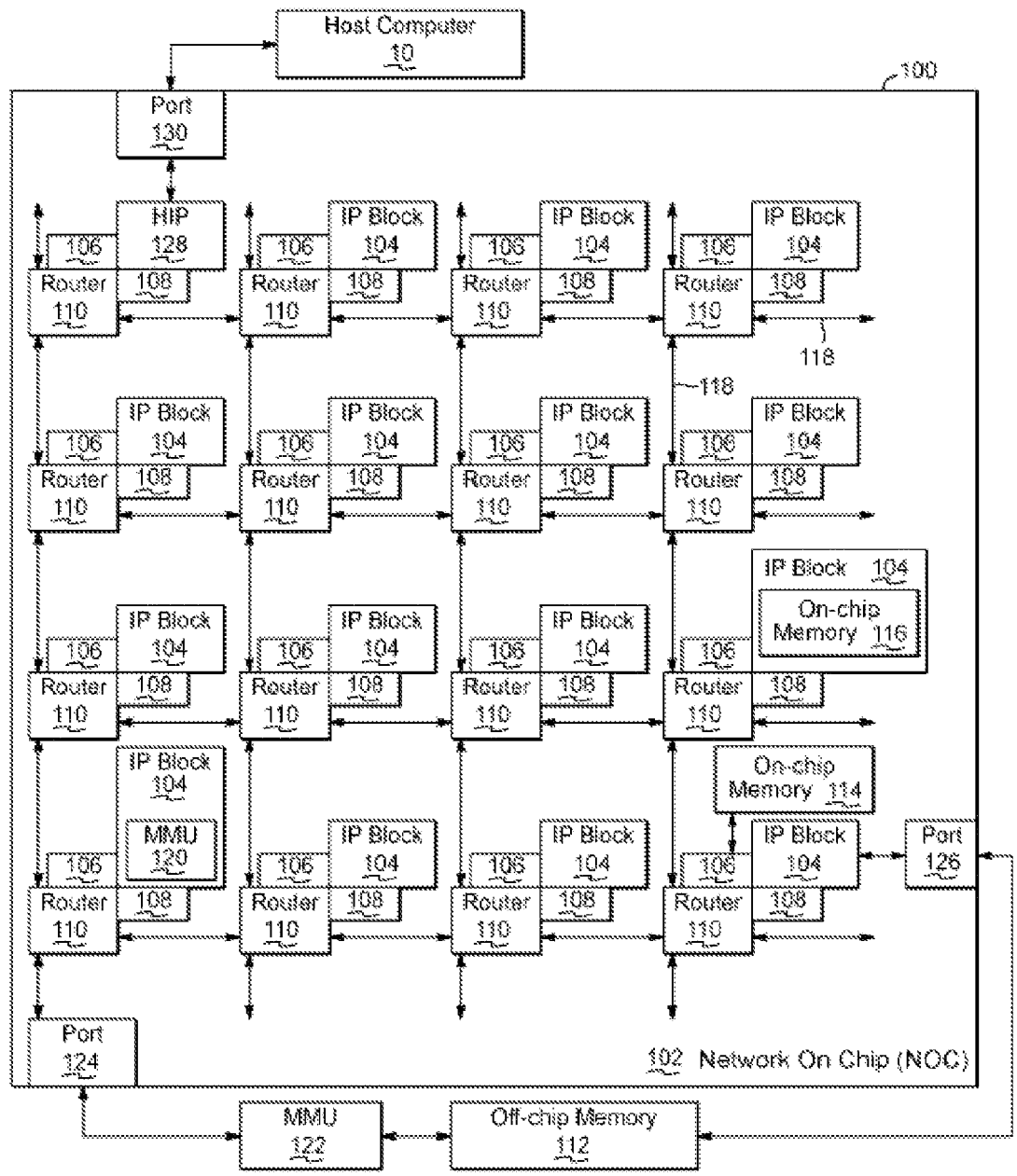
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property.

IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
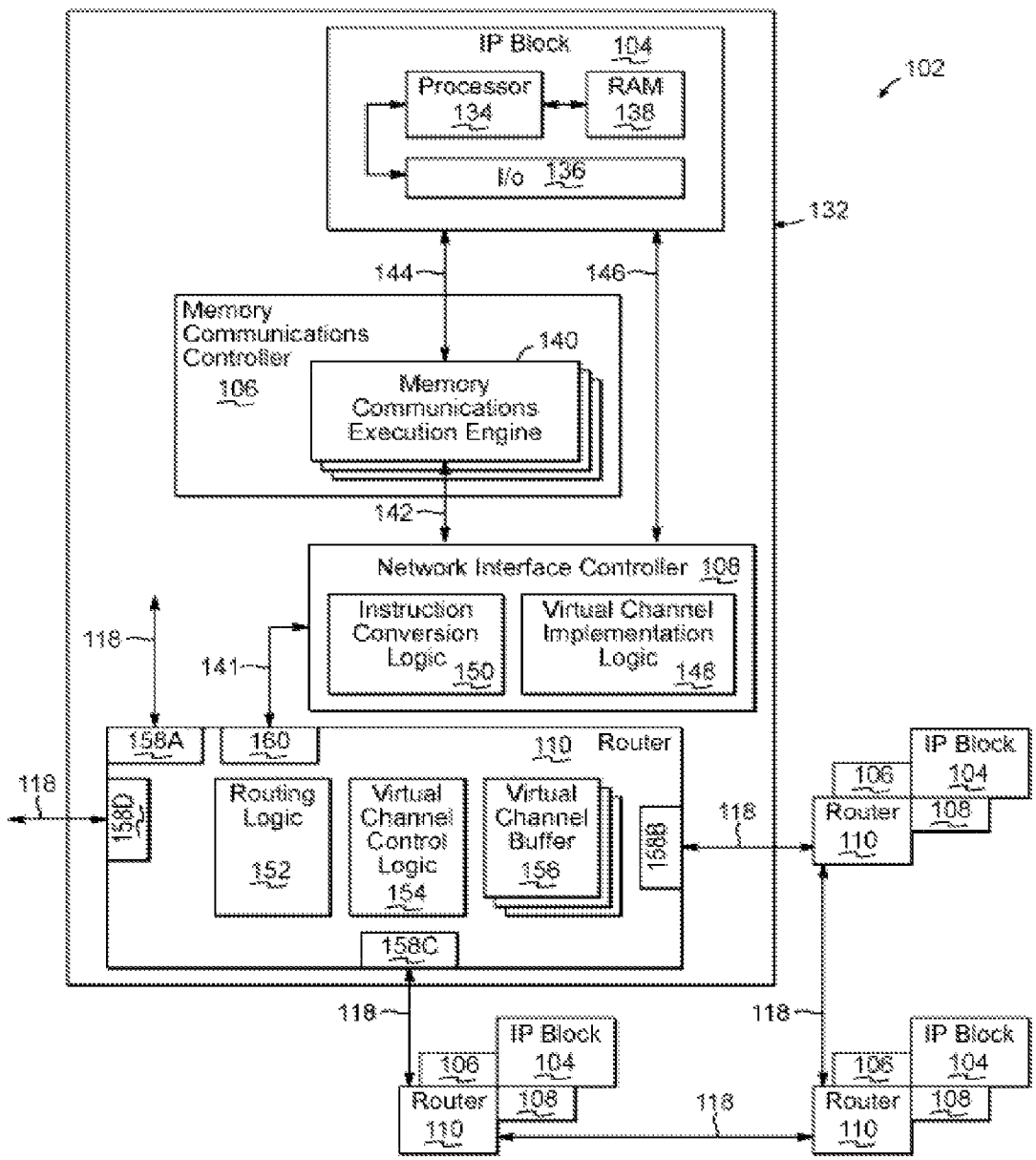
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
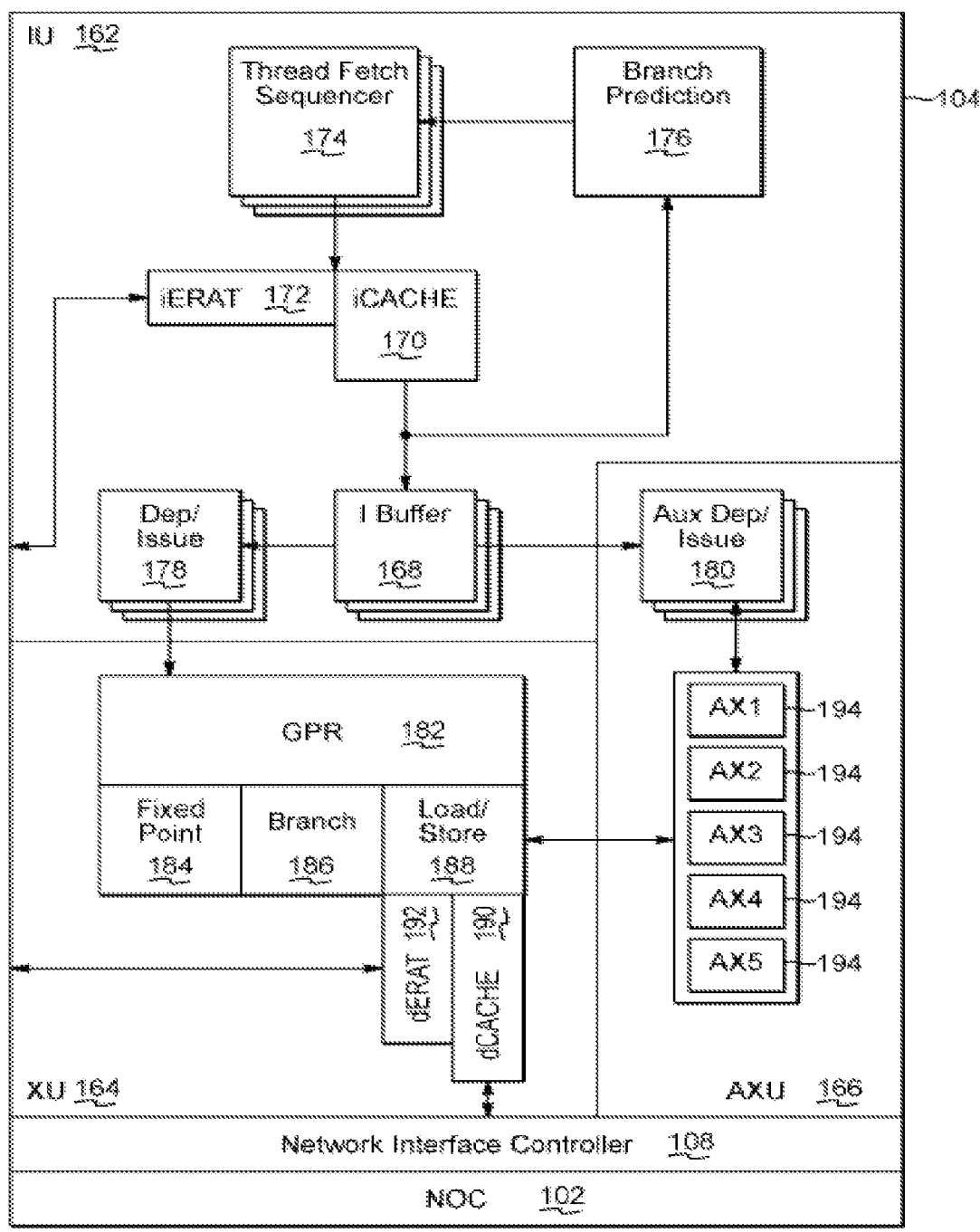
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multi-threaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Thread Scheduling Across Heterogeneous Hardware Threads with Resource Mapping

Consistent with some embodiments of the invention, processes of a workload may be scheduled in a multithreading computing system comprising a plurality of hardware threads configured in heterogeneous processing elements by mapping each process to one or more hardware threads of a processing element using a place and route algorithm. Mapping each process to one or more hardware threads configured in the processing elements may be based at least in part on processing attributes associated with each process. Moreover, mapping each process to one or more hardware threads configured in the processing elements may be based at least in part on hardware resources configured in each processing element. By considering processing attributes of each process, related processes may be mapped to hardware threads associated with similar hardware resources.

In addition, based on the processing attributes of each process, dependent processes may be mapped to proximate hardware threads and/or processing elements to thereby improve data communication efficiencies between processing elements processing the dependent processes. Moreover, based on the processing attributes of each process, processing resource expensive processes (e.g., a process requiring heavy memory utilization, and/or performing operations having a large number of associated instructions) may be mapped to processing elements dedicated to only processing such resource expensive processes and/or processing elements configured with hardware resources for processing the resource expensive processes. As such, embodiments of the invention map processes of a parallel workload to system resources of a parallel computing system to best utilize the system resources for efficiency and/or performance.

The processing resources of the computing system may be represented by a processor space, where locations of the processor space correspond to hardware threads and the processing elements in which the hardware threads are configured. According to embodiments of the invention, each process of the workload is mapped to the processor space such that the process is scheduled for one or more hardware threads and thereby one or more processing elements represented by the portions of the processor space to which the process is mapped. Hence embodiments of the invention divide the processing resources of the computing system among the processes of the workload to utilize the available processing resources. The output—i.e., the mapped processor space—may be utilized by an operating system executing on the computing system as a suggested target for each process of the workload, such that the executing operating system may assign each process according to the mapped processor space. In some embodiments, the mapped processor space may be output in an executable from a compiler executing on the computer system, such that the processes may be assigned according to the mapped processor space.

As such, within the context of a place and route algorithm, which is more conventionally used to place hardware components in a limited physical space and route wiring between the hardware components, processes of a workload may take the place of hardware components, the processing attributes of those processes may take the place of attributes of the hardware components, and the processor space and the hardware threads therein may take the place of the physical space within which the hardware components are placed. Moreover, just as a conventional place and route algorithm may place hardware components that communicate with one another proximate to one another on a chip to minimize latency, in the context of the invention, processes of the workload that work together (i.e., related processes) may be co-located to maximize the sharing of hardware resources. For example, if a first hardware thread of a processing element is scheduled with a first process, a second process that is dependent on the first process may be scheduled on a second hardware thread of the processing element such that the processes may share memory resources of the processing element. A place and route algorithm is therefore repurposed for an entirely different application.

Figure 5:
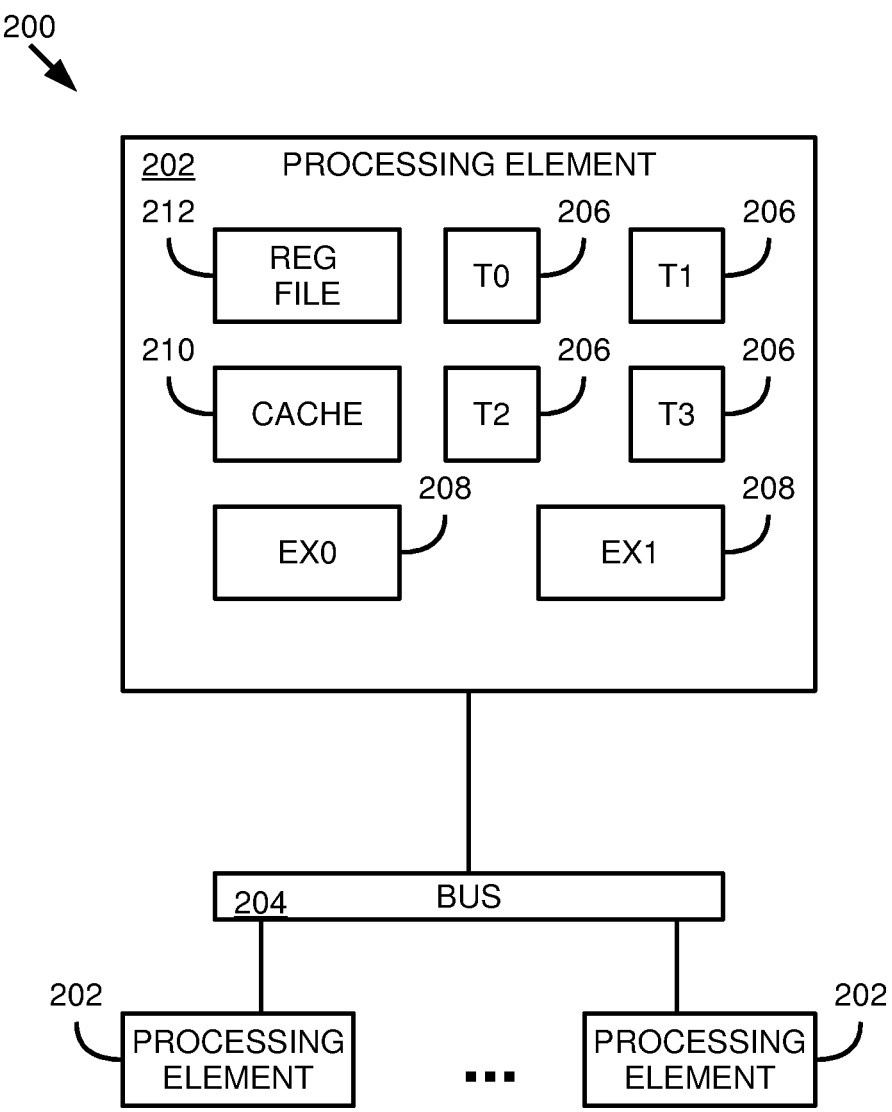
FIG. 5 is a block diagram illustrating processing elements that may be configured in the NOC of FIG. 2.

Turning now to FIG. 5, this figure provides a block diagram of an example implementation of a multithreaded processing environment, data processing system 200 comprising processing elements 202 connected over a communication bus 204. The data processing system 200 may be implemented for example, in the NOC 102 of FIG. 2. As shown, a data processing element 202 may include hardware resources for processing software threads of a process, including one or more hardware threads 206 (the example implementation illustrates four hardware threads labeled T0-T3), one or more execution units 208 (the example implementation illustrates two execution units labeled EX0 and EX1), and/or one or more types of memory including one or more levels of cache memory 210 and/or one or more memory registers 212.

As shown, one or more processing elements 202 may be connected via the communication bus 204, where the processing elements may be configured with different types and/or quantities of hardware resources. For example, the example processing element 202 includes two execution units 208; however, other processing elements 202 of the data processing system 200 may include only one execution unit 208 and/or more than two execution units 208. Similarly, execution units 208 of different processing elements 202 may be configured for executing different types of instructions, for example some processing elements 202 may be configured with one or more execution units 208 configured for vector instructions (i.e., SIMD instructions), while some processing elements 202 may be configured with one or more execution units 208 configured for scalar instructions. Likewise, some processing elements 202 may be configured with hardware resources for processing particular operations. For example, a processing element 202 configured with hardware resources for digital signal processing, such as one or more fixed point execution units and/or one or more memory registers dedicated to the one or more fixed point execution units. Some processing elements may include application-specific coprocessors or accelerators such as expression engines, parsers, DSP engines, compression/decompression engines, graphics, image, media or video processing engines, encryption/decryption engines, etc. Other configurations of hardware resources may be configured in processing elements 202 consistent with embodiments of the invention. In addition, processing elements may be configured with different numbers of hardware threads 206.

Figure 6:
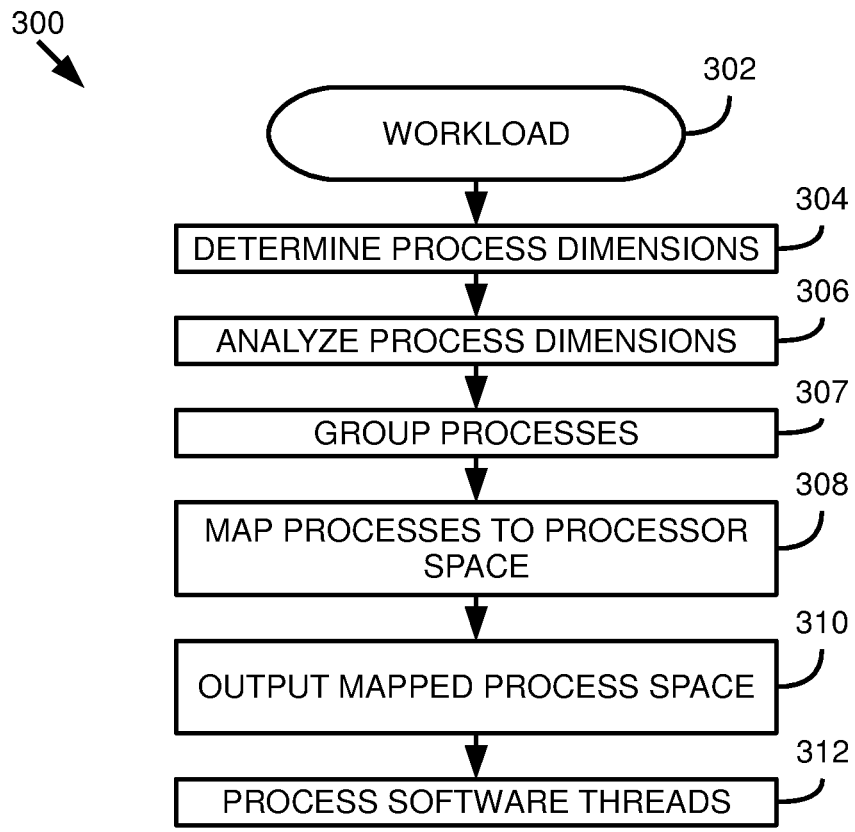
FIG. 6 is a flowchart illustrating a sequence of operations that may be performed by the computer of FIG. 1 to schedule processes of a workload.

FIG. 6 provides flowchart 300 that illustrates a sequence of operations that may be performed by a computing system comprising one or more hardware threads configured in one or more processing elements to schedule processes of a workload to hardware threads of the computing system. As shown, the computing system receives the workload for processing (block 302). In general, the workload includes a plurality of processes that include one or more software threads. The computing system may execute an operating system, where the operating system may include the workload, and the operating system may cause the computing system to analyze available processing resources to allocate the available processing resources to processes of the workload.

The computing system determines process dimensions for each process of the workload (block 304), where the process dimensions are based at least in part on processing attributes associated with each process. Processing attributes generally describe processing resource requirements needed for processing a particular process. For example, a process attribute may indicate memory allocation needed for processing the process, and in embodiments of the invention, the computing system determines process dimensions based at least in part on the memory allocation needed for processing the process. After determining the process dimensions for each process of the workload, the computing system analyzes the process dimensions for each process (block 306). Based on the process dimensions, the processes may be grouped (block 307) into one or more groups such that related processes may be mapped to proximate hardware threads, and such that processes having similar hardware resource requirements may be mapped to different processing elements to reduce processing backlog associated with waiting for hardware resources.

Based on the process dimensions for each process, a place and route algorithm maps each process to a processor space representative of the processing resources of the computing system (block 308), such that the processing resources of the computing system are efficiently utilized to process the workload. In such embodiments portions of the processor space correspond to hardware threads configured in processing elements of the computing system. Therefore, by mapping each process to the processor space based on the process dimensions, the place and route algorithm distributes the processes of the workload across the processing resources based at least in part on the process resource requirements indicated by the processing attributes of each process. A number of different place and route algorithms may be used consistent with the invention, e.g., parallel move, area based partitioning, synchronous Markov chains, asynchronous Markov chains, and/or other such types of place and route algorithms. However, it will be appreciated that the invention is not limited to any specific place and route algorithm.

When mapping the processes based at least in part on the process dimensions, the computing system may map related processes to proximate hardware threads of the processor space, such that software threads of the related processes may be processed by a common processing element and/or processing elements connected over a high-speed bus/interconnect. By mapping related processes to proximate hardware threads software thread dependencies of the related processes may be resolved within the common processing element and/or interconnected processing elements. In some embodiments, mapping the processes to the processor space includes evenly distributing the processes according to the process dimensions over the processor space, such that the workload is evenly distributed on the processing resources of the computing system.

The mapped processor space may be output to the operating system as a suggested target mapping for processes of the workload and/or a destination in the executable from the compiler (block 310). The computing system processes the software threads of each process with the processing elements of the computing system according to the mapped processor space (block 312).

Figure 7:
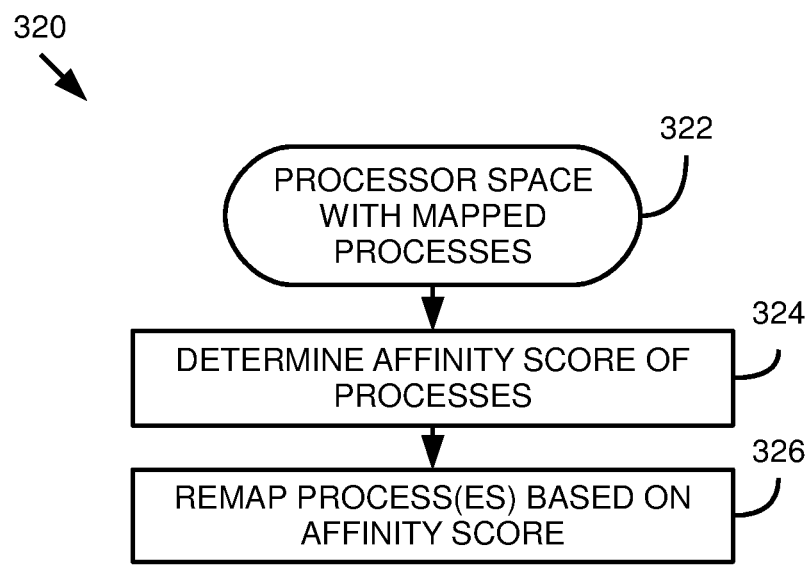
FIG. 7 is a flowchart illustrating a sequence of operations that may be performed by the computer of FIG. 1 to remap the scheduled processes of FIG. 6.

FIG. 7 provides a flowchart 320 that illustrates a sequence of operations that may be performed by a computing system consistent with embodiments of the invention to remap one or more mapped processes. As shown, the computing system may load the processor space with the mapped processes (block 322), and the computing system may analyze the processing attributes of each mapped process to determine an affinity score associated with each process (block 324). In some embodiments, the affinity score may indicate a relation between a first process and a second process, including for example, if the second process is dependent on the first process. Moreover, the affinity score may indicate an affinity for a process to particular hardware threads based at least in part on the hardware resources associated with the hardware thread, i.e., the hardware resources configured in the processing element in which the hardware thread is disposed. The computing system may score each process based on the processing attributes associated with the process. For example, based on the memory requirements associated with a process, a high score may indicate a requirement for extended register addresses for the process, and processes with similar requirements may have similar affinity scores.

Based on the affinity score of each process, the computing system may remap one or more processes to different portions of the processor space (block 326). The computing system may remap one or more processes to group processes having similar processing attributes to hardware threads associated with hardware resources that correspond to the processing attributes. The computing system may remap one or more processes to map a process to a hardware thread disposed in a processing element having hardware resources for processing the process more efficiently and/or faster compared to the portion of the processor space at which the process was originally mapped. Continuing the example provided above, the computing system may remap one or more processes to proximate hardware threads disposed in one or more proximate processing elements configured with extended register addresses.

Hence in these embodiments, the computing system may map the processes of a workload to evenly distribute the workload over the processor space. Following mapping the processes, the computing system may remap one or more processes to group related and/or similar processes, and/or the computing system may remap one or more processes to hardware threads configured in processing elements having hardware resources beneficial for processing such remapped processes.

Figure 8:
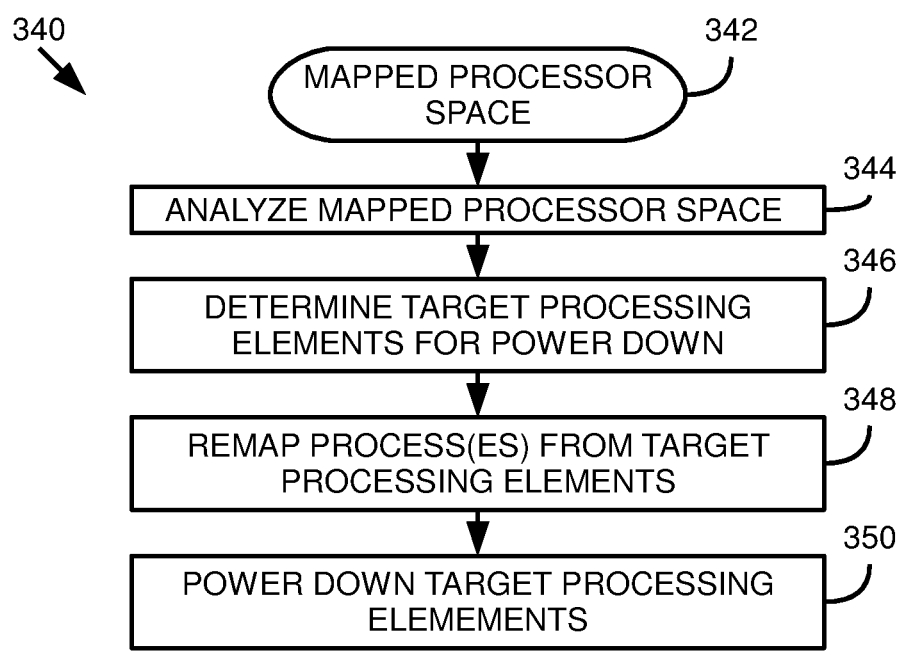
FIG. 8 is a flowchart illustrating a sequence of operations that may be performed by the computer of FIG. 1 to reduce power consumption.

Turning now to FIG. 8, this figure provides a sequence of operations that may be performed by a computing system consistent with embodiments of the invention to process a workload in a low-power mode. The mapped processor space including mapped processes of the workload is loaded by the computing system (block 342). As the mapped processor space generally indicates the hardware threads scheduled to process a workload, the processor space may be analyzed to determine processing elements that may be powered down to reduce power consumption of the computing system (block 344). The computing system determines target processing elements of the computing system to power down for power consumption savings (block 346). In some embodiments, the computing system may analyze the mapped processor space to determine processing elements configured with hardware threads that are not scheduled to process processes of the workload and/or processing elements that configured with a low number of hardware threads relative to the total number of configured hardware threads that are scheduled to process processes of the workload. In addition, in some embodiments, the computing system may also determine processing elements having hardware threads scheduled to process processes with low processing resource requirements relative to other processes of the workload.

If the computing system targets processing elements that are scheduled to process low processing resource requirements processes and/or having a low number of hardware threads scheduled to process processes, the computing system may remap the processes mapped to such targeted processing elements, such that the processes are remapped to hardware threads configured in processing elements not targeted for power down (block 348). Hence, while remapping processes may increase processing time, the power consumption reduction realized by powering down the corresponding processing elements may be performed to meet a power consumption target associated with the computing system. The computing system may power down the targeted processing elements to thereby reduce power consumption (block 350).

Therefore, in some embodiments of the invention the mapped processor space may be analyzed by the computing system to selectively power down processing elements to meet power consumption targets for the computing system. In some embodiments, the mapped processor space may be analyzed by the computing system to dynamically power down idle processing elements. In such embodiments, some processing elements may be configured with hardware resources for specialized operations that are not required by any processes of the workload, and hence, the computing system may dynamically power down the idle processing elements based on the analysis of the mapped processor space.

Figure 9:
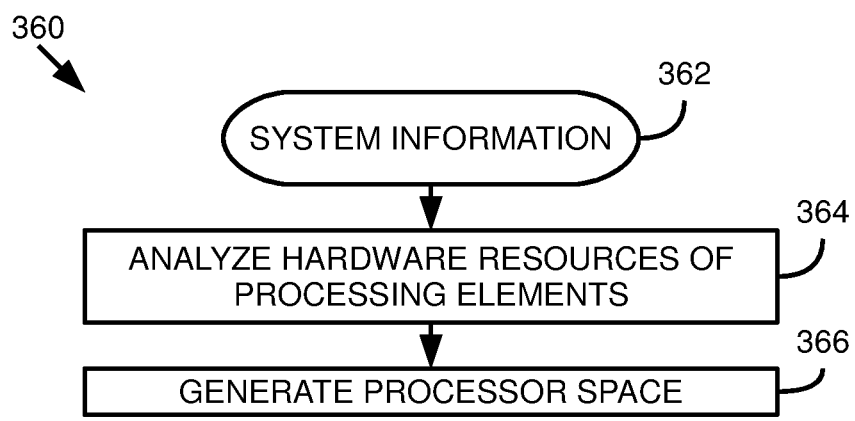
FIG. 9 is a flowchart illustrating a sequence of operations that may be performed by the computer of FIG. 1 to generate a processor space representative of processing resources configured in the computer.

FIG. 9 provides a flowchart 360 that illustrates a sequence of operations that may be performed by a computing system consistent with embodiments of the invention to generate a processor space. In general, a processor space may be representative of the processing resources of the computing system. For example, in multithreaded processing environments including hardware threads configured in processing elements, a location of the processor space may correspond to each hardware thread and a portion comprising one or more locations may therefore correspond to each processing element. As such, when a process is mapped to one or more locations of the processor space, the process is assigned to one or more hardware threads of one or more processing elements for processing thereby.

In some embodiments, the processor space may be generated based at least in part on the hardware resources associated with each hardware thread, such that proximate hardware threads may correspond to proximate locations of the processor space. In addition, hardware threads associated with similar hardware resources may correspond to proximate locations of the processor space. For example, hardware threads associated with vector execution units may correspond to proximate locations of the processor space. In these embodiments, the computing system may load system information corresponding to the computing system (block 362). The system information may include, for example, the quantity and types of hardware resources configured within each processing element and thereby associated with hardware threads of each processing element. The computing system may analyze the hardware resources configured within each processing element (block 364) and generate a processor space (block 366) that groups similarly configured processing elements in the processor space. In embodiments of the invention comprising heterogeneous processing elements, grouping of similar processing elements in the processor space may increase realization of performance/efficiency benefits for parallel processing when mapping processes to the processing elements of the heterogeneous system.

Figure 10:
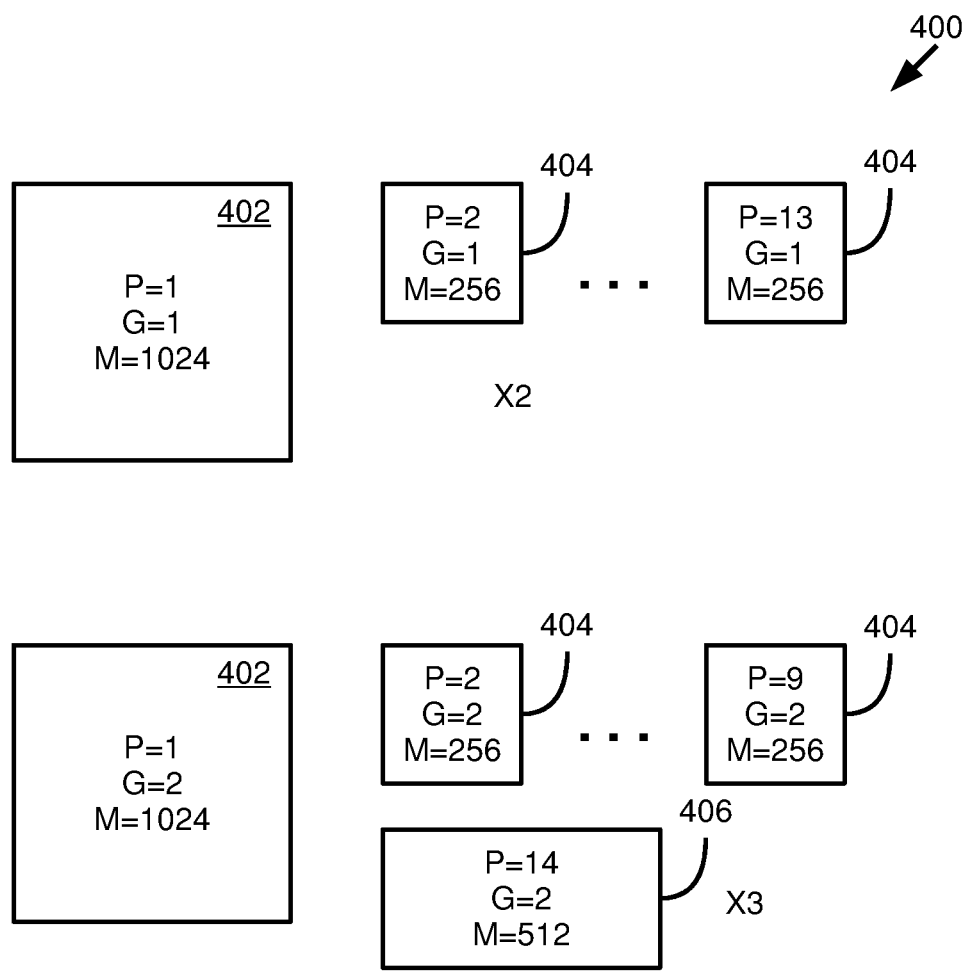
FIG. 10 is a diagrammatic illustration of an example workload that may be processed by the computer of FIG. 1.

To further illustrate the use of a place and route algorithm to map processes in a workload, FIG. 10 provides an example diagrammatic illustration of a workload 400 including a plurality of processes 402-406. In this example, a memory utilization factor (i.e., 'M') is provided for each process 402-406 as a processing attribute. In addition, each process includes a process identification number 'P' and a group identification number 'G'. As shown, the workload 400 includes 5 processes (i.e., 'P=1') 402 that have a memory utilization 'M=1024', 24 processes (i.e., 'P=2' to 'P=13') that have a memory utilization 'M=256', and 3 processes (i.e., 'P=14') that have a memory utilization 'M=512'. According to the memory utilization 'M' of each process 402-406, process dimensions may be determined. As shown in this example, the processes 404 that have a memory utilization of 'M=256' are half the size of processes 406 that have a memory utilization of 'M=512' and one fourth the size of processes 402 that have a memory utilization of 'M=1024'. Hence, the example illustrates the effect that a processing attribute may have on a process dimension, i.e., a process having higher resource requirements indicated by one or more processing attributes may have larger process dimensions, and accordingly may occupy more space of a processor space.

Figure 11:
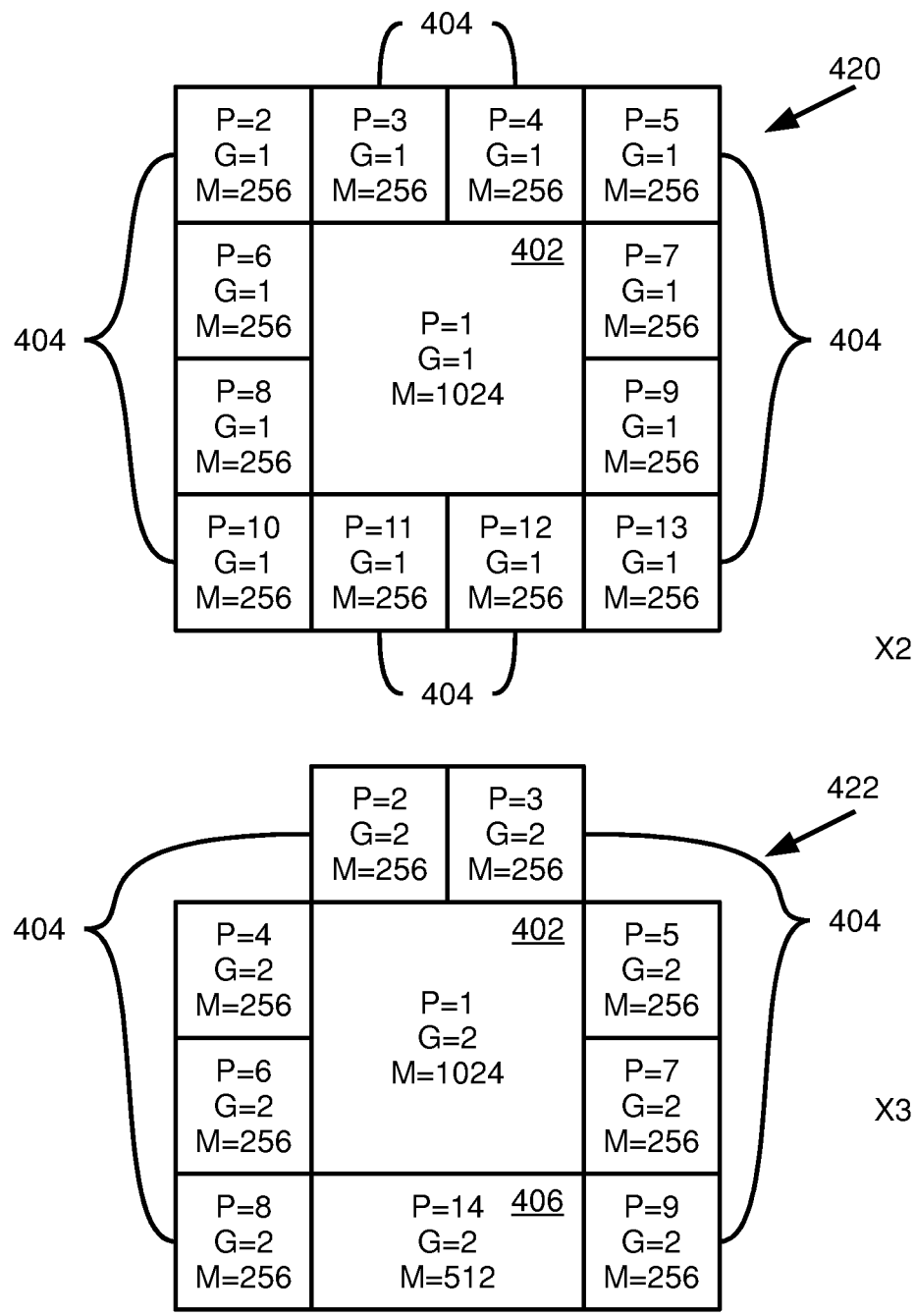
FIG. 11 is a diagrammatic illustration of the example workload of FIG. 10 where the processes have been grouped for mapping to a processor space to thereby schedule the processes for the hardware threads of FIG. 5.

FIG. 11 provides an example of the processes 402-406 of the workload 400 of FIG. 10 grouped by an embodiment of the invention based at least in part on the process dimensions of each process 402-406. Based on the processes of the workload 400, in this example, the processes have been grouped into two types of groups: a first group ('G=1') 420 comprising a process 'P1' 402 that has a memory utilization of 'M=1024' and 12 processes 'P=2' to 'P=13' 404 that have a memory utilization of 'M=256'; and a second group ('G=2') 422 comprising a process 'P1' 402 that has a memory utilization of 'M=1024', 8 processes 'P=2' to 'P=9' that have a memory utilization of 'M=256', and a process 'P=14' 206 that has a memory utilization of 'M=512'.

Figure 12A:
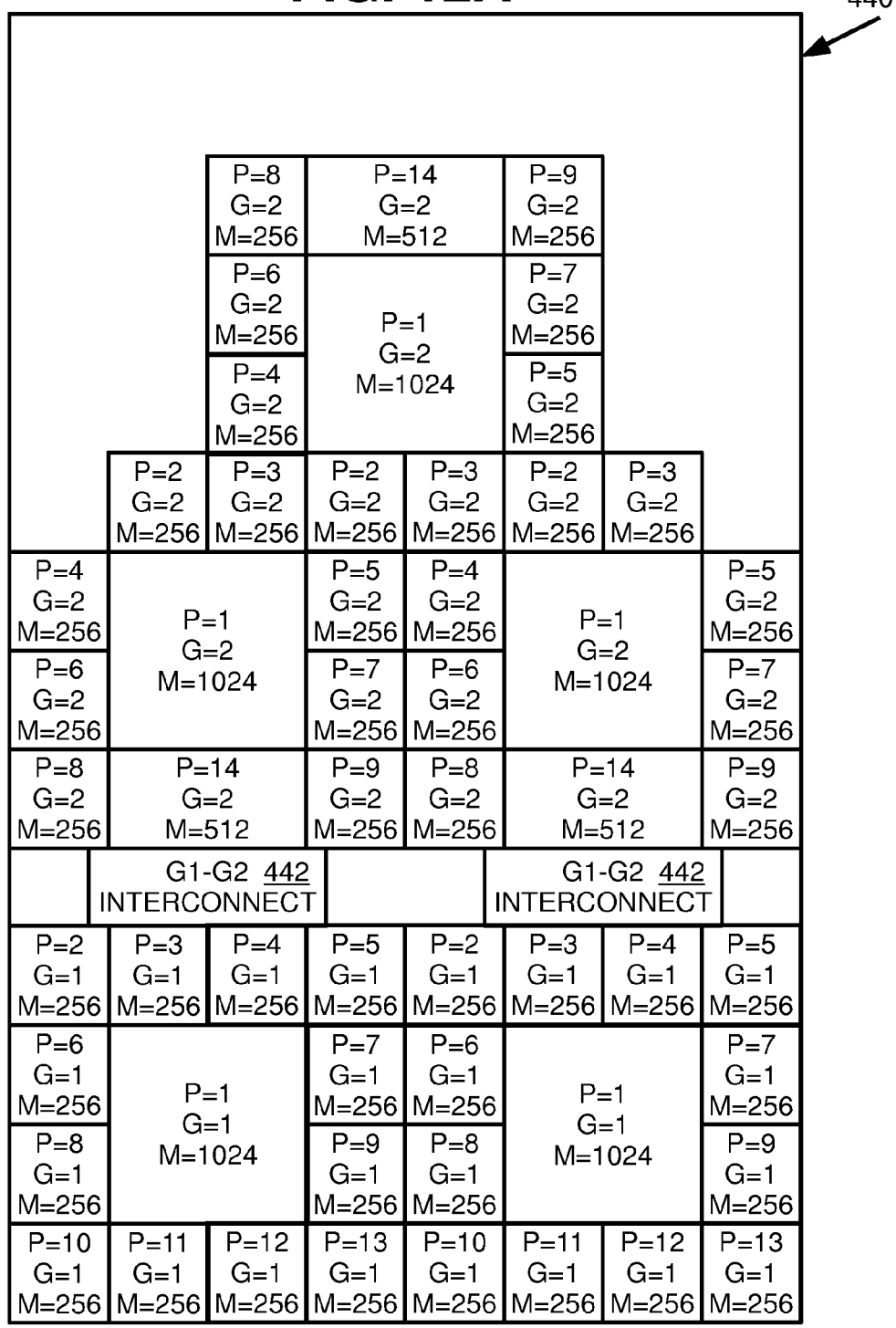
FIG. 12A is a diagrammatic illustration of the example workload of FIG. 10 and the example groups of FIG. 11 mapped to a processor space consistent with embodiments of the invention using a place and route algorithm to thereby generate a schedule for distributing the processes of the workload to hardware threads of the processing elements of FIG. 5.
Figure 12B:
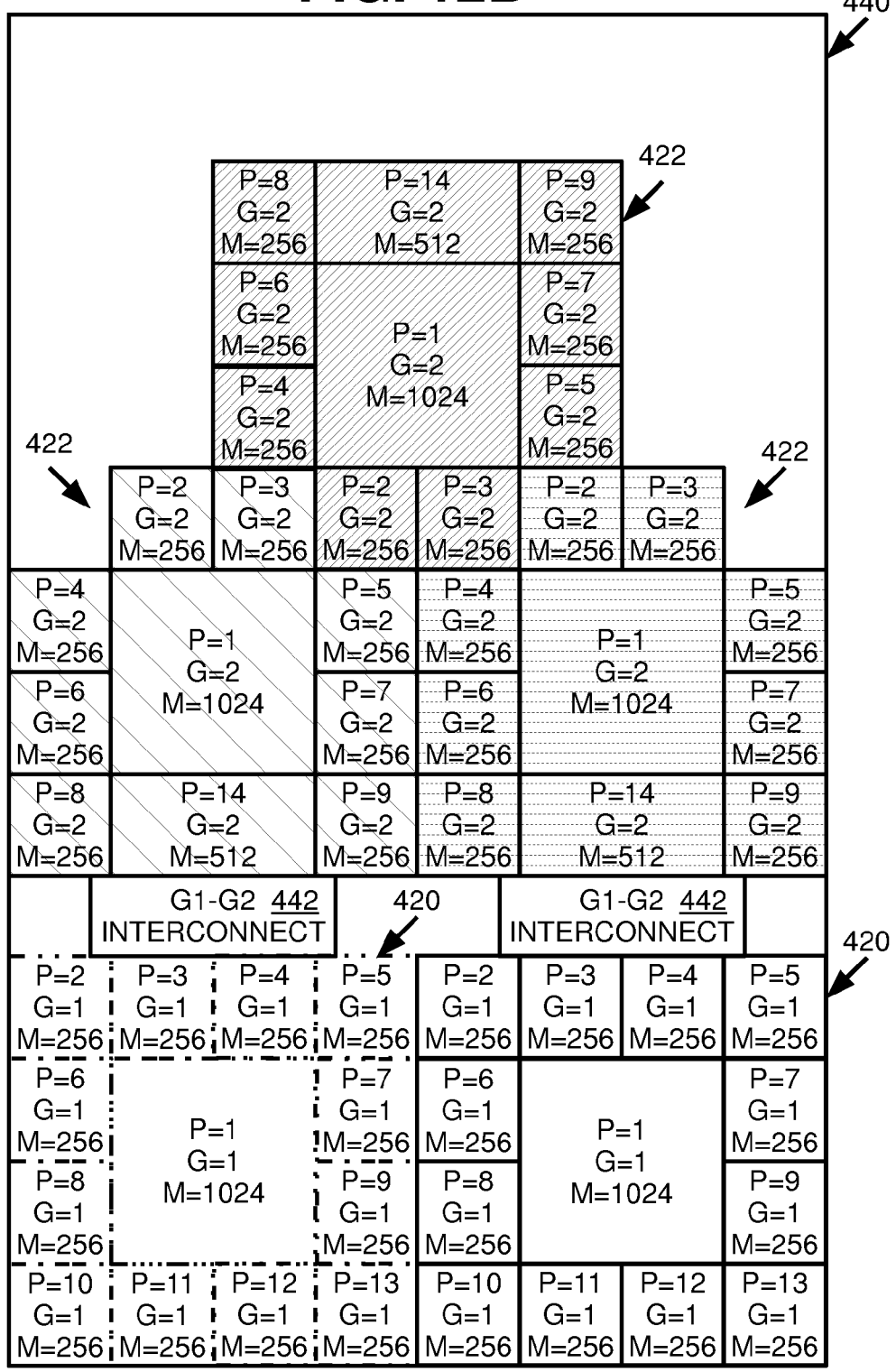
FIG. 12B is a diagrammatic illustration of the example mapped processor space of FIG. 12A that includes shading to illustrate the placement of the groups of processes in the processor space of FIG. 11.

FIGS. 12A-B provide an example of the groups 420,422 of FIG. 11 mapped to a processor space 440, where locations of the processor space correspond to hardware threads configured in processing elements of a processing system. FIG. 12A illustrates the groups 420,422 mapped to the processor space 440, and FIG. 12B provides shading to distinguish between the groups 420,422 for reference. As shown, one or more interconnect processes 442 may be mapped to the processor space 440 that may perform operations to communicate data between groups of processes 420,422. Furthermore, consistent with embodiments of the invention, and as illustrated in FIGS. 12A and 12B, the place and route algorithm maps the processes to the processor space 440 such that related processes may be grouped and located proximate to one another. In addition, processes requiring similar hardware resources may be mapped to different hardware threads and/or processing elements such that during processing a processing backlog does not occur due to waiting for the hardware resources. In addition, the by grouping and mapping the processes using the place and route algorithm, portions of the processor space 440 may be unused (i.e., idle), such that some embodiments of the invention may power down processing elements associated with the unused portions to thereby reduce power consumption.

Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A computing system, comprising:
   a processor;
   a memory;
   program code stored in the memory and configured to be executed by the processor to cause the processor to schedule a plurality of processes of a workload on hardware threads of a plurality of processing elements using a place and route algorithm by:
   representing processing resources of the computing system by generating a processor space having locations corresponding to the hardware threads of the plurality of processing elements, the processor space generated based at least in part on hardware resources associated with the hardware threads of the plurality of processing elements such that hardware threads associated with similar hardware resources are assigned proximate locations of the processor space;
   assigning process dimensions to the plurality of processes of the workload based at least in part on at least one processing attribute associated with each process among the plurality of processes, the process dimensions representative of one or more locations in the processor space and depending at least in part on the at least one processing attribute associated with each process;
   analyzing the process dimensions assigned to each process;
   grouping the plurality of processes into one or more groups based at least in part on the determined process dimensions for each process to map related processes to proximate hardware threads and/or map processes having similar hardware resource requirements to hardware threads in different processing elements;
   mapping each process among the plurality of processes to at least one location in the processor space based at least in part on the assigned process dimensions using the place and route algorithm; and
   causing the processor to schedule each process among the plurality of processes to at least one hardware thread corresponding to the at least one location to which the process is mapped.

2. The computing system of claim 1, wherein the at least one processing attribute includes at least one of: memory use of the process, location of memory used by the process during execution, instruction distribution of the process, and types of instructions included in the process.

3. The computing system of claim 1, wherein the program code is further configured to cause the processor to remap a first process to a different location of the processor space that is proximate to a second location having a second process mapped thereto that is related to the first process.

4. The computing system of claim 3, wherein the program code is configured to remap the first process to the different location of the processor space by:
   determining an affinity score for the first process and the second process based at least in part on the associated at least one processing attribute; and
   remapping the first process to the different location of the processor space based at least in part on the affinity score of the first process and the affinity score of the second process.

5. The computing system of claim 4, wherein the program code is configured to remap the first process to the different location of the processor space by:
   identifying the second process having an affinity score indicating that the second process is related to the first process.

6. The computing system of claim 3, wherein the program code is configured to cause the processor to schedule the first process and the second process on proximate hardware threads based on the processor space.

7. The computing system of claim 1, wherein the program code is further configured to cause the processor to analyze the processor space and the processes mapped thereto to identify at least one target processing element to target for power reduction, and power down the at least one targeted processing element.

8. The computing system of claim 7, wherein the program code is further configured to cause the processor to remap at least one process from a hardware thread of the targeted processing element prior to powering down the at least one targeted processing element.

9. The computing system of claim 1, wherein the processing elements are heterogeneous processing elements.

10. A computer program product comprising:
    a non-transitory computer readable storage medium; and
    program code stored on the computer readable medium and configured upon execution to schedule a plurality of processes of a workload on hardware threads of a plurality of processing elements using a place and route algorithm by:
    representing processing resources of the computing system by generating a processor space having locations corresponding to the hardware threads of the plurality of processing elements, the processor space generated based at least in part on hardware resources associated with the hardware threads of the plurality of processing elements such that hardware threads associated with similar hardware resources are assigned proximate locations of the processor space;
    assigning process dimensions to the plurality of processes of the workload based at least in part on at least one processing attribute associated with each process among the plurality of processes, the process dimensions representative of one or more locations in the processor space and depending at least in part on the at least one processing attribute associated with each process;
    analyzing the process dimensions assigned to each process;
    grouping the plurality of processes into one or more groups based at least in part on the determined process dimensions for each process to map related processes to proximate hardware threads and/or map processes having similar hardware resource requirements to hardware threads in different processing elements;
    mapping each process among the plurality of processes to at least one location in the processor space based at least in part on the assigned process dimensions using the place and route algorithm; and causing the processor to schedule each process among the plurality of processes to at least one hardware thread corresponding to the at least one location to which the process is mapped.

11. The computer program product of claim 10, wherein the at least one processing attribute includes at least one of: memory use of the process, location of memory used by the process during execution, instruction distribution of the process, and types of instructions included in the process.

12. The computer program product of claim 10, wherein the program code is further configured to cause the processor to remap a first process to a different location of the processor space that is proximate to a second location having a second process mapped thereto that is related to the first process.

13. The computer program product of claim 12, wherein the program code is configured to remap the first process to the different location of the processor space by:

determining an affinity score for the first process and the second process based at least in part on the associated at least one processing attribute; and remapping the first process to the different location of the processor space based at least in part on the affinity score of the first process and the affinity score of the second process.

14. The computer program product of claim 13, wherein the program code is configured to remap the first process to the different location of the processor space by:

identifying the second process having an affinity score indicating that the second process is related to the first process.

15. The computer program product of claim 12, wherein the program code is configured to cause the processor to schedule the first process and the second process on proximate hardware threads based on the processor space.

16. The computer program product of claim 10, wherein the program code is further configured to cause the processor to analyze the processor space and the processes mapped thereto to identify at least one target processing element to target for power reduction, and power down the at least one targeted processing element.

17. The computer program product of claim 16, wherein the program code is further configured to cause the processor to remap at least one process from a hardware thread of the targeted processing element prior to powering down the at least one targeted processing element.

18. The computer program product of claim 10, wherein the processing elements are heterogeneous processing elements.

19. The computing system of claim 1, wherein the program code is further configured to generate the processor space by grouping similar processing resources and positioning the similar processing resources at proximate locations to one another in the processor space.

20. The computing system of claim 19, wherein the program code is further configured to group related processes among the plurality of processes into at least one group, and wherein the place and route algorithm is configured to map the group of related processes to proximate locations in the processor space to reduce processing backlog associated with waiting for processing resources.

* * * * *